(12) United States Patent
Kennedy et al.

(10) Patent No.: US 8,555,610 B2
(45) Date of Patent: Oct. 15, 2013

(54) METHOD OF PROTECTING A LUG AND A CHAIN OF A LUMBER DRAG CHAIN AND A PROTECTED LUMBER DRAG CHAIN

(75) Inventors: Russell Kennedy, Hot Springs, AR (US); Chris Raybon, Hot Springs, AR (US); Pat Conry, Hot Springs, AR (US)

(73) Assignee: Baxley Equipment Co., Hot Springs, AR (US)

( * ) Notice: Subject to any disclaimer, the term of this patent is extended or adjusted under 35 U.S.C. 154(b) by 0 days.

(21) Appl. No.: 13/468,181

(22) Filed: May 10, 2012

(65) Prior Publication Data

US 2012/0285136 A1 Nov. 15, 2012

Related U.S. Application Data (60) Provisional application No. 61/484,866, filed on May 11, 2011.

(51) Int. Cl.
*F16G 13/12* (2006.01)
*B21L 19/00* (2006.01)

(52) U.S. Cl.
USPC .................. 59/35.1; 59/31; 59/78; 59/93

(58) Field of Classification Search
USPC ............... 59/31, 35.1, 78, 93; 144/123
See application file for complete search history.

(56) References Cited

U.S. PATENT DOCUMENTS

| 3,561,509 | A | * | 2/1971 | Hayden .................... 144/123 |
| 3,844,420 | A | * | 10/1974 | Walling et al. ............ 414/22.62 |
| 3,901,005 | A | * | 8/1975 | Rohrbach et al. ............ 56/330 |
| 3,967,396 | A | * | 7/1976 | Maisonneuve et al. ......... 37/104 |
| 4,205,501 | A | * | 6/1980 | Michels .................... 53/228 |
| 2012/0285136 | A1 | * | 11/2012 | Kennedy et al. ............ 59/31 |

* cited by examiner

*Primary Examiner* — David B Jones
(74) *Attorney, Agent, or Firm* — Jeffrey S. Melcher; Manelli Selter PLLC (57) ABSTRACT

Provided is a method of protecting a drag chain for a lumber mill and a drag chain having a chain guard and a lug guard. The chain guard and lug guard each only require use of a single weld washer for mounting.

18 Claims, 6 Drawing Sheets

METHOD OF PROTECTING A LUG AND A CHAIN OF A LUMBER DRAG CHAIN AND A PROTECTED LUMBER DRAG CHAIN

This application claims priority to U.S. Patent Application No. 61/484,866, filed 11 May 2011, the complete disclosure of which is incorporated herein by reference.

FIELD OF THE INVENTION

The invention relates to a method of protecting a lug and a chain of a lumber drag chain. The invention also relates to a protected lumber drag chain.

BACKGROUND OF THE INVENTION

For many years, automated lumber sorters have been used in most high-production sawmills rather than manually hand pulling the lumber. These sorters can have from as few as 10 to 12 sorts up to 75 plus sorts. Since the bay centers are between 30 inches and 4 to 6 feet in width, the sorters can be quite long. The lumber must be conveyed down the lumber transport system in order to be sorted or "dropped" into the appropriate bay. Several types of lumber transports have been used in the past. The lumber transports all involve some sort of overhead chain conveying system, either dragging, pushing, or carrying the boards.

An example of a lumber sorter apparatus and how the sorter works is disclosed in U.S. Pat. No. 5,934,480, the complete disclosure of which is incorporated herein by reference.

One type of lumber transport system uses a lumber drag chain system. This system has been used for many years, mostly in the southern U.S. by companies such as HEMCO, Hi-Tech Engineering and Baxley Equipment Company. In this system, lumber is dragged down the conveying system, generally on plastic skids, by multiple strands of overhead chain with spaced apart lugs. The lumber is then tippled into the appropriate bay by a pneumatically operated device called a tipple.

Figure 6:
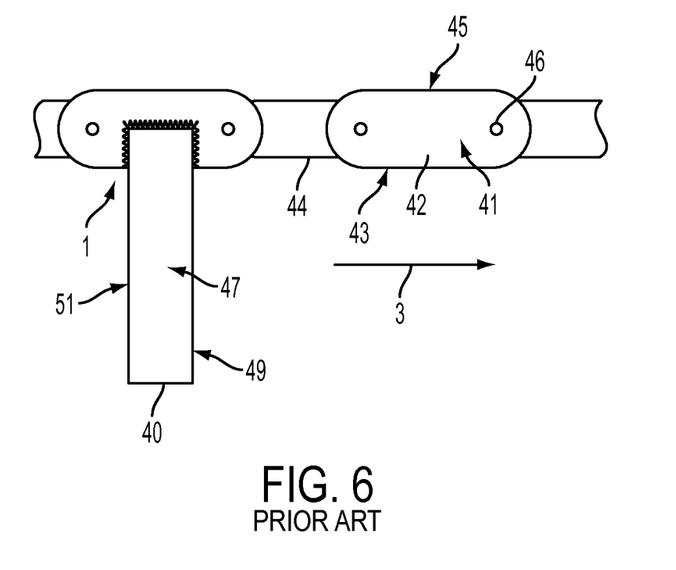
FIG. 6 [prior art] illustrates a side view of prior art drag chain without guards.
Figure 7:
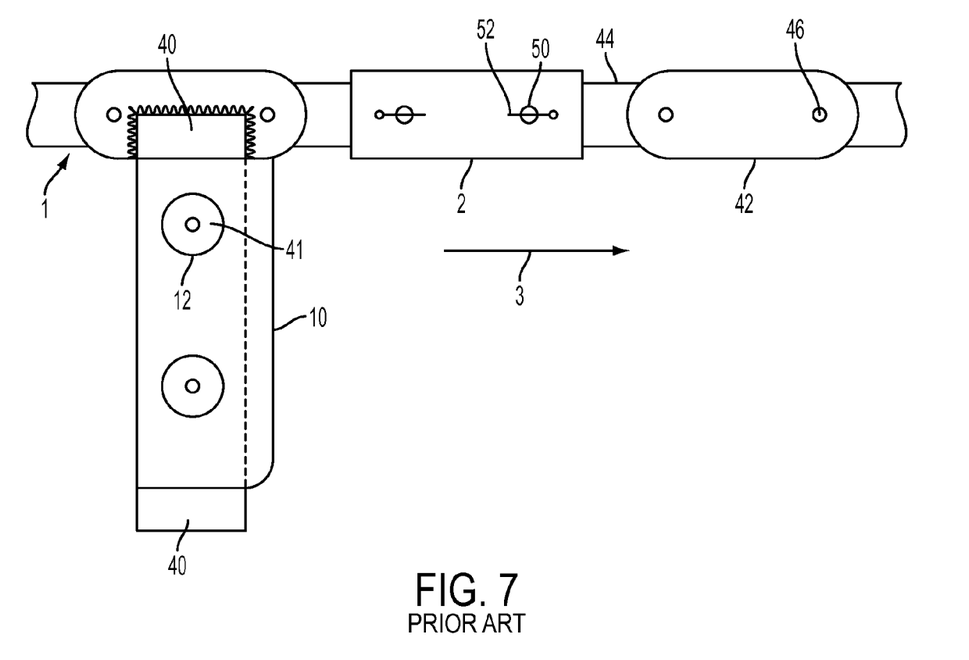
FIG. 7 [prior art] illustrates a side view of a prior art drag chain with guards.
Figure 8:
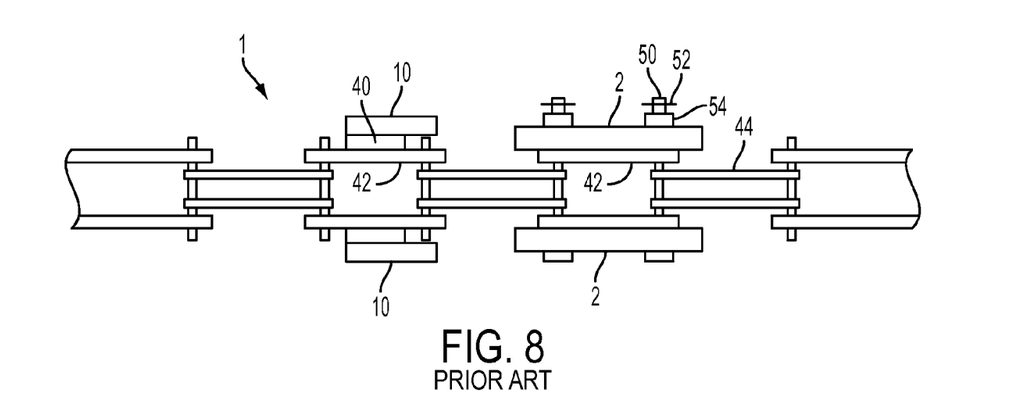
FIG. 8 [prior art] illustrates a top view of a prior art drag chain with guards.
Figure 9:
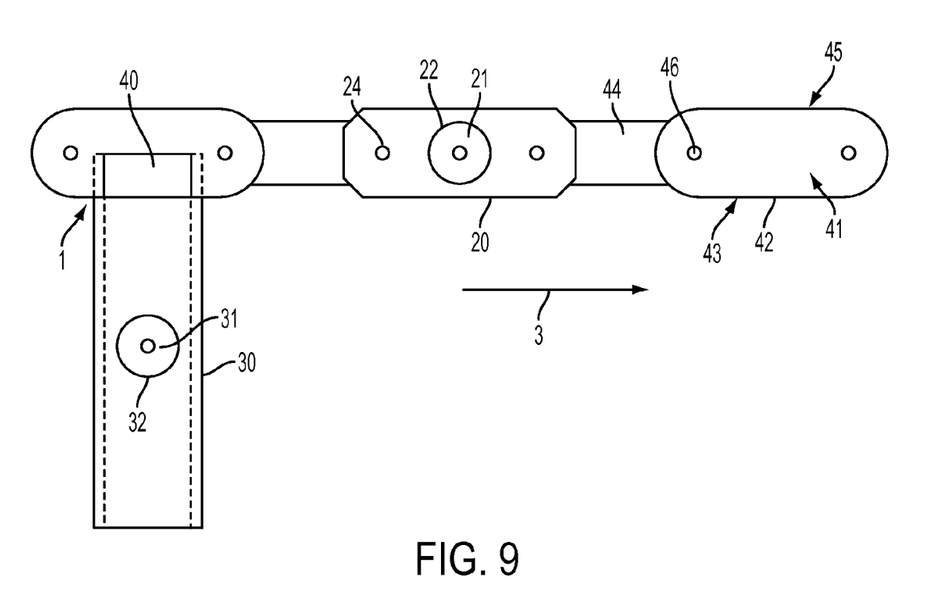
FIG. 9 illustrates a side view of a drag chain with guards according to the present invention.

FIGS. 6-8 [prior art] generally show a prior art drag chain 1 having inner metal chain links 44, outer metal chain links 42, and pins 46 connecting the inner and outer metal chain links. Each chain link has an outer surface 41, a top side surface 45, and a bottom side surface 43. A plurality of spaced-apart lugs 40 each extend from the bottom of an associated metal chain link. The lug 40 has a first surface 47 that is substantially parallel to the outer surface 41 of the associated metal link. The lug 40 has a lumber contacting side surface 49 and a second side surface 51 opposite the lumber contacting side surface 49. While the lug 40 is shown in the drawings being attached to an outer chain link, the lug 40 can be attached an inner chain link as desired. The connection between the lug 40 and the chain link can be any as desired, such as welding. Alternatively, the chain link can be integrally formed with the lug 40. The lug 40 is usually about 1.5 inches wide, 0.25 inches thick, and 5.75 inches long, but can be narrower, thicker or longer as desired for the particular lumber products being run. An example of a suitable chain is a 81X, in which the links have a pitch of 2.609 inches and a height of 1.125 inches. However, any size chain can be used as desired for the particular lumber dragging application. The direction of the chain flow during use is shown by arrow 3.

Figure 2A:
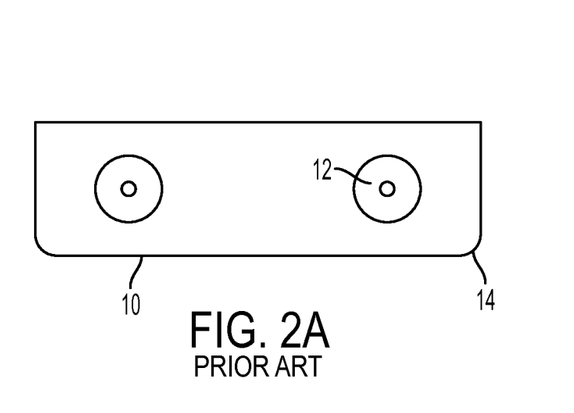
FIGS. 2A-2B [prior art] illustrate a prior art lug guard.
Figure 2B:
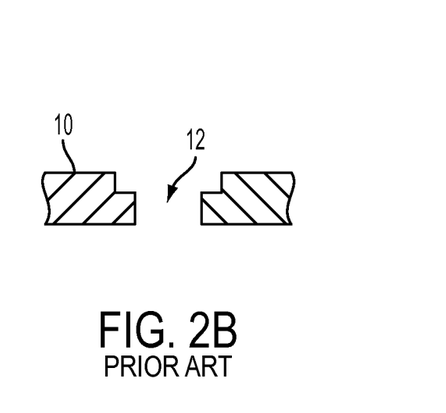

As shown in FIGS. 2, 7 and 8 [prior art], the prior art drag chain utilizes lug guards 10 to prevent unwanted contact between the lug 40 and lumber. FIG. 2B is a cross-section of the lug guard 10 at the location of weld hole 12. The weld hole 12 is constructed and sized to receive a weld washer 71. The lug guards 10 are typically formed from a plastic, such as ultra high molecular weight polyethylene. The lug guards 10 are held in place by two metal weld washers 71 that are disposed in weld holes 12 and are welded to the lug 40. The lug guard 10 extends beyond the lumber contacting side surface 49 to prevent the lumber from contacting the lumber contacting side surface 49 during use. The lug guard 10 requires at least two weld washers 71 to prevent unwanted rotation of the lug guard 10. The lug guard 10 utilizes rounded corners 14.

Figure 1A:
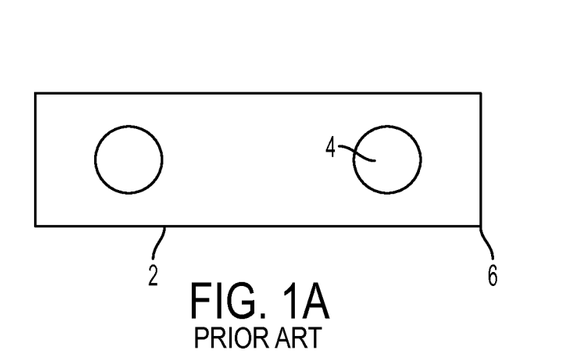
FIGS. 1A-1B [prior art] illustrate a prior art chain guard.
Figure 1B:
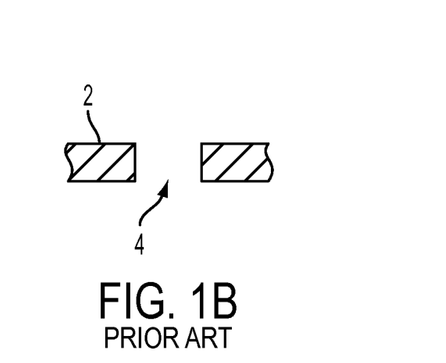

As shown in FIGS. 1, 7 and 8 [prior art], the prior art drag chain also generally utilizes guards to prevent unwanted contact between the lumber and the chain, hereinafter referred to as chain guards 2. FIG. 1B is a cross section of the guard 2 at a location of the hole 4. To mount the chain guard 2, two pins 46 must be removed from the chain, i.e. the chain must be broken, and the pins 46 replaced with longer connecting pins 50, washers 54 and cotter pins 52. The chain guard 2 has two holes 4, through which the longer connecting pins 50 are disposed. The chain guard 2 extends beyond the bottom side surface 43 of the metal chain link to prevent lumber from contacting the chain during use. The chain guard 2 has generally square corners 6, which tend to snag the lumber during use.

The drag chains typically have opposing pairs of lugs 40, lug guards 10, and chain guards 2 at each location, as shown in FIG. 8 [prior art]. Prior art methods of applying the lug guards 10 and chain guards 2 are expensive and the required down time is extensive to field install the guards on existing equipment. There is a great need for a more economical and faster method for installing lug guards 10 and chain guards 2.

SUMMARY OF THE INVENTION

An objective of the invention is to provide a more efficient method of guarding the lugs and chain links of a drag chain.

Another object of the invention is to provide a chain guard which does not require breaking of the chain for installation.

A further object of the invention is to provide a lug guard that requires less than two weld washers to mount the lug guard.

These objectives and other objectives are obtained by a method of protecting a lumber drag chain comprising:

a metal chain having a plurality of outer and inner metal links movably connected by pins, each chain link having an outer surface, a top side surface and a bottom side surface; and a plurality of spaced-apart lugs each connected to an associated metal chain link, the lugs each comprising an elongated metal strip extending from a bottom of the associated metal chain link, the lug having a first surface that is substantially parallel with the outer surface of the associated metal link, a lumber contacting side surface, and a second side surface opposite the lumber contacting side surface, the method comprising:

applying a lug guard to the lug, the lug guard contacting at least a portion of the first surface of the lug and contacting at least a portion of the lumber contacting side surface or the second side surface of the lug, the lug guard extending beyond the lumber contacting side surface so that during use lumber contacts the lug guard and not the lumber contacting side surface, and the lug guard having a weld hole constructed to receive a metal weld washer;

inserting a metal weld washer into the weld hole and welding the weld washer to the metal strip, wherein the lug guard is held in place by the single weld washer and the lug guard is prevented from rotating by the lug guard contacting at least one of the lumber contacting side surface or the second side surface of the lug;

applying a chain guard to a first metal chain link, the chain guard contacting at least a portion of the outer surface of the first metal chain link, the chain guard having indents or holes constructed to allow the pins in the first metal chain link to extend within the chain guard so that the chain guard can contact the outer surface of the first metal chain link, the chain guard extending beyond a bottom side surface of the first metal chain link so that during use lumber contacts the chain guard and the lug guard, and not the first metal link or the lug, the chain guard engaging at least a portion of a top side surface of the first metal chain link or the bottom side surface of the first metal chain link, the chain guard being constructed to allow adjacent chain links to rotate about the pins connecting the adjacent chain links to the first metal chain link, and the chain guard having a second weld hole constructed to receive a metal weld washer; and inserting a second metal weld washer into the second weld hole and welding the second weld washer to the outer surface of the first metal chain link, wherein the chain guard is held in place by the single second weld washer and the chain guard is prevented from rotating by the chain guard contacting at least one of the top or bottom side surfaces of the first metal chain link.

These objectives and other objectives are further obtained by a lumber drag chain comprising:

a metal chain having a plurality of outer and inner metal links movably connected by pins, each chain link having an outer surface, top side surface and a bottom side surface;

a plurality of spaced-apart lugs each connected to an associated metal chain link, the lugs each comprising an elongated metal strip extending from a bottom of the associated metal chain link, the lug having a first surface that is substantially parallel with the outer surface of the associated metal link, a lumber contacting side surface, and a second side surface opposite the lumber contacting side surface;

a lug guard contacting at least a portion of the first surface of the lug and contacting at least a portion of the lumber contacting side surface or the second side surface of the lug, the lug guard extending beyond the lumber contacting side surface so that during use the lumber contacts the lug guard and not the lumber contacting side surface, and the lug guard having a weld hole constructed to receive a metal weld washer;

a metal weld washer in the weld hole, the metal weld washer being welded to the metal strip, wherein the lug guard is held in place by the single weld washer and the lug guard is prevented from rotating by the lug guard contacting at least one of the lumber contacting side surface or the second side surface of the lug;

a chain guard contacting at least a portion of the outer surface of a first metal chain link, the chain guard having indents or holes constructed to allow the pins in the first metal chain link to extend within the chain guard so that the chain guard can contact the outer surface of the first metal chain link, the chain guard extending beyond a bottom side surface of the first metal chain link so that during use lumber contacts the chain guard and the lug guard, and not the first metal link or the lug, the chain guard engaging at least a portion of a top side surface of the first metal chain link or the bottom side surface of the first metal chain link, the chain guard being constructed to allow adjacent chain links to rotate about the pins connecting the adjacent chain links to the first metal chain link, and the chain guard having a second weld hole constructed to receive a metal weld washer; and a second metal weld washer in the second weld hole, the second weld washer being welded to the outer surface of the first metal chain link, wherein the chain guard is held in place by the single second weld washer and the chain guard is prevented from rotating by the chain guard contacting at least one of the top or bottom side surfaces of the first metal chain link.

The objectives and other objectives are further met by a lug guard for protecting a lug of a lumber drag chain comprising:

an elongated molded plastic body having a length 4-12 inches, a width of 1-3 inches, a thickness of ¼ to 2 inches, the body having at least one overhanging edge along one side of the length of the body, the overhanging edge having a thickness of ⅛ to 1 inches, a single weld hole in the body constructed to receive a weld washer, the body constructed to contact at least a portion of a first surface of a lug and contacting at least a portion of a lumber contacting side surface or a second side surface of the lug, the body being sized to extend beyond the lumber contacting side surface so that during use lumber contacts the lug guard and not the lumber contacting side surface, the weld hole being located on the body so that during use unwanted rotation of the lug guard around the weld washer is prevented by the overhanging edge contacting the lumber contacting side surface or the second side surface.

The objectives and other objectives are also obtained by a chain guard for protecting a lumber drag chain comprising:

an elongated molded plastic body having a length 4-12 inches, a width of 1-3 inches, a thickness of ¼ to 2 inches, the body having at least one overhanging edge along a portion of one side of the length of the body, the overhanging edge having a thickness of 1/16 to ¼ inches, the edge and body being constructed so that when the chain guard is mounted on a chain link, adjacent links can pivot about connecting pins, a single weld hole in the body constructed to receive a weld washer, the body constructed to contact at least a portion of an outer surface of a chain link and contacting at least a portion of top side surface or bottom side surface of a chain link, the body being sized to extend beyond a bottom of the chain link surface so that during use lumber contacts the chain guard and not the chain link, the weld hole being located on the body so that during use unwanted rotation of the chain guard around the weld washer is prevented by the overhanging edge contacting the top side surface or bottom side surface of the chain link.

DETAILED DESCRIPTION OF PREFERRED EMBODIMENTS

Figure 3A:
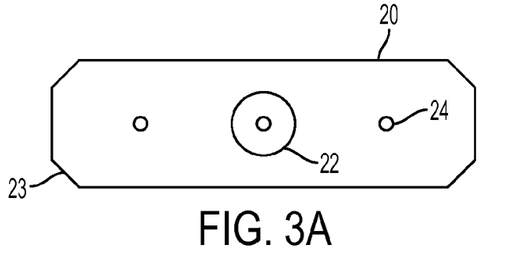
FIGS. 3A-3D illustrate a chain guard according to the present invention.
Figure 3B:
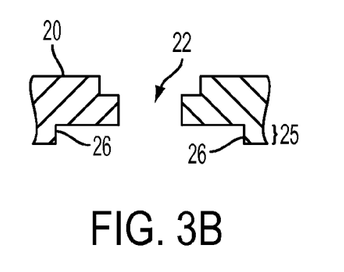
Figure 3C:
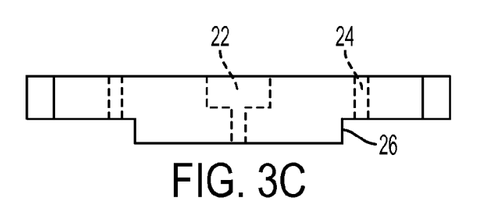
Figure 3D:
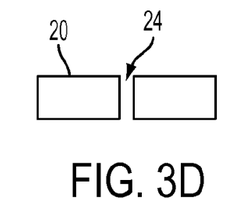

The invention will be explained with reference to the attached non-limiting drawings. As shown in FIGS. 3A-3D, 9 and 10, a chain guard 20 is provided. The chain guard 20 has a weld hole 22 constructed to receive a weld washer 71. Two indents or holes 24 are provided, which line up with the pins 46 on the metal chain, so that when the chain guard 20 is placed on the metal chain link, the pins 46 are disposed within the indents or holes 24 so that the chain guard 20 can contact the outer surface 41 of the chain link. The chain guard 20 is constructed to contact at least one of the top side surface 45 or the bottom side surface 43 of the chain link, an example of which is shown by one of the overhanging edges 26 in FIG. 3B. FIG. 3B is a cross-section of the chain guard 20 at the location of the hole 22. FIG. 3D is a cross-section of the chain guard 20 at the location of hole or indent 24. Preferably, the chain guard 20 is constructed to contact both the top side surface 45 and the bottom side surface 43 of the chain link, an example of which is shown by overhanging edges 26 in FIG. 3B. Preferably, the chain guard 20 is constructed so that the adjacent chain links can rotate about the pins 46, as shown in FIG. 3D, in which location the chain guard 20 does not contact the bottom side surface 43 or top side surface 45 of the chain link. However, at the location of FIG. 3D, the chain guard 20 can extend to the thickness of the chain link on the top and bottom sides if desired, while still allowing movement of adjacent links. The chain guard 20 must extend beyond the bottom of the chain link so that during use the lumber 62 does not contact the chain, as shown in FIG. 11.

Only one weld waster 71 is required to bond the chain guard 20 to the chain. Unwanted rotation of the chain guard 20 around the weld washer 71 is prevented by the portion 26 of the chain guard 20 contacting at least one of the top side surface 45 or bottom side surface 43 of the chain link. Preferably, the chain guard 20 has only one weld hole 22 and is mounted to the chain link only using one weld washer 71. No breakage of the chain and replacement of pins is necessary with the improved chain guard 20, which results in a significant reduction in down time and labor cost. The prior art chain guard 2 requires breakage of the chain for installation. 1

The chain guard 20 preferably does not have square or sharp corners 23 to prevent lumber 62 from being snagged during use. If a wreck occurs where the lumber 62 becomes out of position, the user can simply kick or push the lumber 62 into place so that the lumber 62 is against the lug guard 30 without having to life the chains.

Figure 4A:
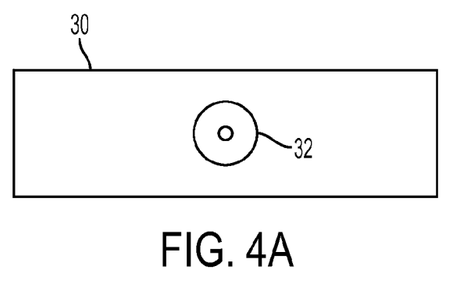
FIGS. 4A-4B illustrate a lug guard according to the present invention.
Figure 4B:
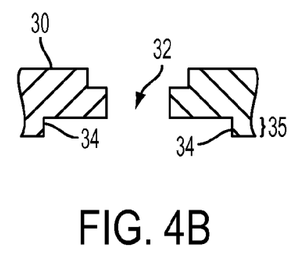
Figure 5:
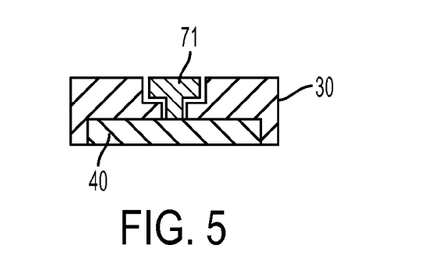
FIG. 5 illustrates section of the lug guard being welded to the lug according to the present invention.

As shown in FIGS. 2A-2B, 4A-4B, 5, 9 and 10, a lug guard 30 is provided. The lug guard 30 is constructed to contact the first surface 47 of the lug 40 and contact at least one of a lumber contacting side surface 49 or a second side surface 51 opposite the lumber contacting side surface 49, an example of which is shown at one of the overhanging edges 34 in FIG. 4B. FIG. 4B is a cross-section of the lug guard 30 at the location of weld hole 32. Preferably, the lug guard 30 is constructed to contact both the lumber contacting side surface 49 and the second side surface 51, an example of which is shown at overhanging edges 34 in FIG. 4B. The lug guard 30 extends beyond the lumber contacting side surface 49 so that during use the lumber 62 contacts the lug guard 30 and not the lumber contacting side surface 49 of the lug 30. The lug guard 30 has a weld hole 32 constructed to receive a weld washer 71.

Only one weld washer 71 is required to mount the lug guard 30 to the lug 40. Preferably, the lug guard 30 has only one hole 32 and only one weld washer 71 is used to mount the lug guard 30 on the lug 40. Unwanted rotation of the lug guard 30 around the weld washer 71 is prevented by the lug guard 30 contacting at least one of the lumber contacting side surface 49 or the second side surface 51 opposite the lumber contacting side surface 49. Prior art lug guards 10 shown in FIG. 2A require at least two weld washers 71. Thus, the present invention reduces by half the number of weld washers 71 required, and therefore half the required welds. The time and expense of applying the claimed lug guards 30 is up to half that of the prior art lug guards 10.

Figure 10:
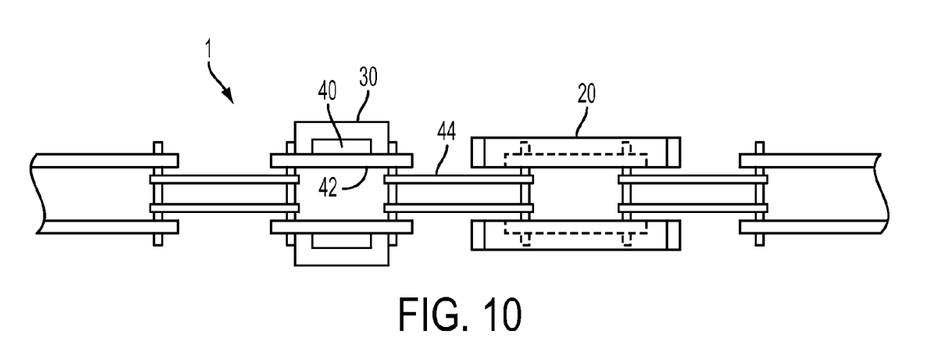
FIG. 10 illustrates a top view of a drag chain with guards according to the present invention.
Figure 11:
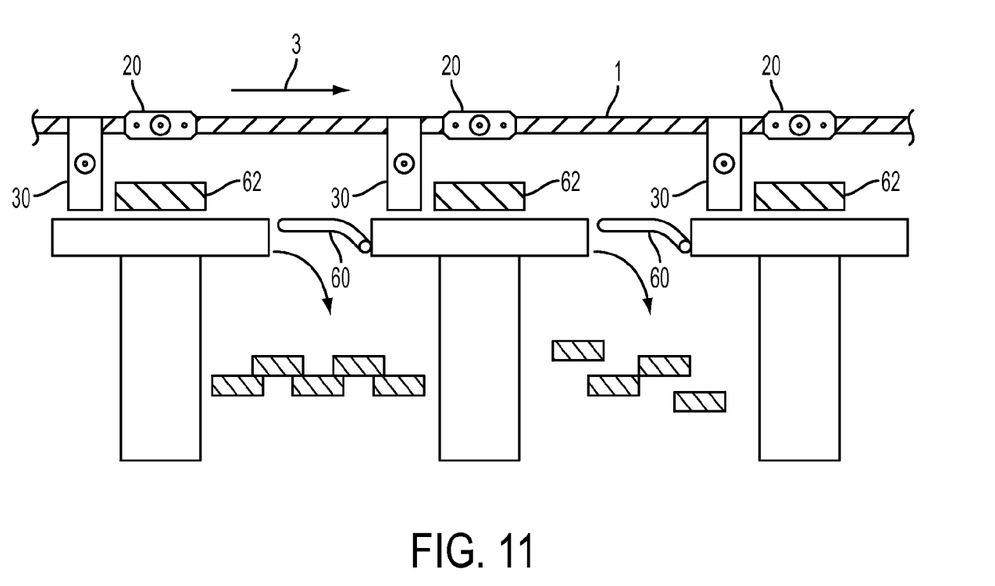
FIG. 11 illustrates a drag chain with guards according to the present invention in use on a lumber sorter.

The lug guards 30 and chain guards 20 can be mounted as opposing pairs on opposing pairs of chain links, as shown in FIG. 10.

Drag chains 1 with lugs 40 used in lumber mills are now well known. The improved structure of the present chain guard 20 and lug guard 30 can be used on any conventional drag chain for a lumber mill.

Any conventional weld washers 71 can be used in the present invention. The use and welding of weld washers 71 is now well known and any conventional method of welding the weld washers 71 can be used herein.

Wear resistant materials used for guards are now well known in the art. Plastic is a preferred material, but any desired wear resistant material can be used, such as alloys and composites. Any suitable material for the prior art plastic guards used on drag chains can be used in the improved structure of the present chain guard 20 and lug guard 30. When the guards are machined, a preferred material is ultra high molecular weight polyethylene. When the guards are molded, a preferred material is polyurethane. Examples of other suitable plastics include nylons, polypropylenes, and polyethylenes.

The present chain guard 20 and lug guard 30 are preferably molded, but can be produced in any desired manner.

The chain guard 20 and lug guard 30 can be sized to fit larger or smaller chains 1 and lugs 40 as desired. For a standard lug 40 having a size of about 1.5 inches wide, 0.25 inches thick, and 5.75 inches long, a preferred size for the lug guard 30 is ¼ inches thick for the edge portion 35 contacting the sides of the lug 40, ⅜ inches thick at the center, 5.75 inches long, 2 inches wide at the top, and 1.5 inches wide between the overhanging edges 26, shown in FIG. 4B. For a standard 81X chain, a preferred size for the chain guard 20 is ⅜ inches thick at the center, ⅛ inches thick for the edge portion 25 contacting the sides of the chain link, 6.25 inches long, 1⅞ inches wide on top, and 1.13 inches between the overhanging portions 34.

If the lug guard 30 is molded from polyurethane, exemplary dimensions are, without being limited thereto, a length of 4-12 inches, a width of 1-3 inches, a thickness of ¼ to 2 inches, and an overhanging edge thickness 35 of ⅛ to 1 inches. If the chain guard 20 is molded from polyurethane, exemplary dimensions, without being limited thereto, are a length of 4-12 inches, a width of 1-3 inches, a thickness of ¼ to 2 inches, and an overhanging edge thickness 25 of 1/16 to ¼ inches.

The invention also relates a method of protecting a lumber drag chain 1. The structure of the drag chain 1 is as described above. The method comprises applying a lug guard 30 to the lug 40. The lug guard 30 contacts at least a portion of the first surface 47 of the lug 40 and a portion of the lug guard 30, for example an overhanging edge 34, contacts at least a portion of the lumber contacting side surface 49 or the second side surface 51 of the lug 40. The lug guard 30 extends beyond the lumber contacting side surface 49 as shown in FIG. 7 so that during use lumber 62 contacts the lug guard 30 and not the lumber contacting side surface 49, as shown in FIG. 11. The lug guard 30 has a single weld hole 32 sized to receive a metal weld washer 71. A metal weld washer 71 is inserted into the weld hole 32 and welded to the lug 49. The lug guard 30 is held in place by the single weld washer 71 and the lug guard 30 is prevented from rotating around the weld washer 71 by the lug guard 30 contacting at least one of the lumber contacting side surface 49 or the second side surface 51 of the lug 30.

A chain guard 20 is applied to a first metal chain link. The chain guard 20 contacts at least a portion of the outer surface 41 of the first metal chain link. The chain guard has indents or holes 24 constructed to allow the pins 46 in the first metal chain link to extend within the chain guard 20 so that the chain guard 20 can contact the outer surface 41 of the first metal chain link. The chain guard 20 extends beyond a bottom side surface of the first metal chain link so that during use lumber 62 contacts the chain guard 20 and the lug guard 30, and not the first metal link or the lug 40, as shown in FIG. 11. The chain guard 20 engages at least a portion of a top side surface 45 of the first metal chain link or the bottom side surface 43, for example using an overhanging edge 26, of the first metal chain link. The chain guard 20 is constructed to allow adjacent chain links to rotate about the pins 46 connecting the adjacent chain links to the first metal chain link. The chain guard has a single second weld hole 22 sized to receive a metal weld washer 71. A second metal weld washer 71 is inserted into the second weld hole 22 and welded to the outer surface 41 of the first metal chain link. The chain guard 20 is held in place by the single second weld washer 71. The chain guard 20 is prevented from rotating around the weld washer 71 by the chain guard 20 contacting at least one of the top side surface 45 or the bottom side surface 43 of the first metal chain link.

In the present invention, it is no longer necessary to break the chain in multiple places to install chain guards. Furthermore, it is no longer necessary to use multiple weld washers for the lug guards. The present invention provides significant savings in cost and labor, as well as significantly reduced down time when installing the improved guards on existing chains in the field.

Use of the protected drag chain according to the invention is further shown in FIG. 11, in which lumber 62 is dragged by the lugs 40 of the drag chain. The lumber 62 does not contact the lugs 40 or chain. The lumber 62 contacts the improved lug guards 30 and chain guards 20. When the lumber 62 reaches the desired bin, the correct tipple 60 opens and the lumber 62 drops into the desired bin. If the lumber 62 becomes out of place, a user can easily adjust the lumber position by sliding the lumber against the chain guard 20 until the lumber 62 contacts the lug guard 30. The chain guard 20 is free of sharp corners 23, which facilitates easy movement of the lumber 62 against the chain guard 20.

While the claimed invention has been described in detail and with reference to specific embodiments thereof, it will be apparent to one of ordinary skill in the art that various changes and modifications can be made to the claimed invention without departing from the spirit and scope thereof.

The invention claimed is:

1. A method of protecting a lumber drag chain comprising: a metal chain having a plurality of outer and inner metal links movably connected by pins, each chain link having an outer surface, a top side surface and a bottom side surface; and
a plurality of spaced-apart lugs each connected to an associated metal chain link, the lugs each comprising an elongated metal strip extending from a bottom of the associated metal chain link, the lug having a first surface that is substantially parallel with the outer surface of the associated metal link, a lumber contacting side surface, and a second side surface opposite the lumber contacting side surface, the method comprising:
applying a lug guard to the lug, the lug guard contacting at least a portion of the first surface of the lug and contacting at least a portion of the lumber contacting side surface or the second side surface of the lug, the lug guard extending beyond the lumber contacting side surface so that during use lumber contacts the lug guard and not the lumber contacting side surface, and the lug guard having a weld hole constructed to receive a metal weld washer;
inserting a metal weld washer into the weld hole and welding the weld washer to the metal strip, wherein the lug guard is held in place by the single weld washer and the lug guard is prevented from rotating by the lug guard contacting at least one of the lumber contacting side surface or the second side surface of the lug;
applying a chain guard to a first metal chain link, the chain guard contacting at least a portion of the outer surface of the first metal chain link, the chain guard having indents or holes constructed to allow the pins in the first metal chain link to extend within the chain guard so that the chain guard can contact the outer surface of the first metal chain link, the chain guard extending beyond a bottom side surface of the first metal chain link so that during use lumber contacts the chain guard and the lug guard, and not the first metal link or the lug, the chain guard engaging at least a portion of a top side surface of the first metal chain link or the bottom side surface of the first metal chain link, the chain guard being constructed to allow adjacent chain links to rotate about the pins connecting the adjacent chain links to the first metal chain link, and the chain guard having a second weld hole constructed to receive a metal weld washer; and
inserting a second metal weld washer into the second weld hole and welding the second weld washer to the outer surface of the first metal chain link, wherein the chain guard is held in place by the single second weld washer and the chain guard is prevented from rotating by the chain guard contacting at least one of the top or bottom side surfaces of the first metal chain link.

2. The method according to claim 1, wherein the lug guard is constructed to contact the lumber contacting side surface and the second side surface of the lug.

3. The method according to claim 1, wherein the chain guard is constructed to contact the top and the bottom side surfaces of the first metal chain link.

4. The method according to claim 1, wherein the lug guard comprises an overhanging edge that contacts at least one of the lumber contacting side surface or the second side surface of the lug.

5. The method according to claim 1, wherein the chain guard comprises an overhanging edge that contacts at least one of the top or bottom side surfaces of the first metal chain link.

6. The method according to claim 1, wherein the chain guard and the lug guard are each molded from a plastic material.

7. The method according to claim 1, wherein only a single weld washer is used to mount the lug protector to the lug and only a single weld washer is used to mount the chain guard to the chain, and the chain is not broken to mount the chain guard to the chain.

8. The method according to claim 1, wherein the chain guard is free of corners to avoid unwanted snagging of lumber during use.

9. A lumber drag chain comprising:
a metal chain having a plurality of outer and inner metal links movably connected by pins, each chain link having an outer surface, top side surface and a bottom side surface;
a plurality of spaced-apart lugs each connected to an associated metal chain link, the lugs each comprising an elongated metal strip extending from a bottom of the associated metal chain link, the lug having a first surface that is substantially parallel with the outer surface of the associated metal link, a lumber contacting side surface, and a second side surface opposite the lumber contacting side surface;
a lug guard contacting at least a portion of the first surface of the lug and contacting at least a portion of the lumber contacting side surface or the second side surface of the lug, the lug guard extending beyond the lumber contacting side surface so that during use the lumber contacts the lug guard and not the lumber contacting side surface, and the lug guard having a weld hole constructed to receive a metal weld washer;
a metal weld washer in the weld hole, the metal weld washer being welded to the metal strip, wherein the lug guard is held in place by the single weld washer and the lug guard is prevented from rotating by the lug guard contacting at least one of the lumber contacting side surface or the second side surface of the lug;
a chain guard contacting at least a portion of the outer surface of a first metal chain link, the chain guard having indents or holes constructed to allow the pins in the first metal chain link to extend within the chain guard so that the chain guard can contact the outer surface of the first metal chain link, the chain guard extending beyond a bottom side surface of the first metal chain link so that during use lumber contacts the chain guard and the lug guard, and not the first metal link or the lug, the chain guard engaging at least a portion of a top side surface of the first metal chain link or the bottom side surface of the first metal chain link, the chain guard being constructed to allow adjacent chain links to rotate about the pins connecting the adjacent chain links to the first metal chain link, and the chain guard having a second weld hole constructed to receive a metal weld washer; and
a second metal weld washer in the second weld hole, the second weld washer being welded to the outer surface of the first metal chain link, wherein the chain guard is held in place by the single second weld washer and the chain guard is prevented from rotating by the chain guard contacting at least one of the top or bottom side surfaces of the first metal chain link.

10. The chain according to claim 9, wherein the lug guard is constructed to contact the lumber contacting side surface and the second side surface of the lug.

11. The chain according to claim 9, wherein the chain guard is constructed to contact the top and the bottom side surfaces of the first metal chain link.

12. The chain according to claim 9, wherein the lug guard comprises an overhanging edge that contacts at least one of the lumber contacting side surface or the second side surface of the lug.

13. The chain according to claim 9, wherein the chain guard comprises an overhanging edge that contacts at least one of the top or bottom side surfaces of the first metal chain link.

14. The chain according to claim 9, wherein the chain guard and the lug guard are each molded from a plastic material.

15. The chain according to claim 9, wherein only a single weld washer is used to mount the lug protector to the lug and only a single weld washer is used to mount the chain guard to the chain, and the chain is not broken to mount the chain guard to the chain.

16. The chain according to claim 9, wherein the chain guard is free of corners to avoid unwanted snagging of lumber during use.

17. A lug guard for protecting a lug of a lumber drag chain comprising:
an elongated molded plastic body having a length 4-12 inches, a width of 1-6 inches, a thickness of ¼ to 2 inches, the body having at least one overhanging edge along one side of the length of the body, the overhanging edge having a thickness of ⅛ to 1 inches, a single weld hole in the body constructed to receive a weld washer, the body constructed to contact at least a portion of a first surface of a lug and contacting at least a portion of a lumber contacting side surface or a second side surface of the lug, the body being sized to extend beyond the lumber contacting side surface so that during use lumber contacts the lug guard and not the lumber contacting side surface, the weld hole being located on the body so that during use unwanted rotation of the lug guard around the weld washer is prevented by the overhanging edge contacting the lumber contacting side surface or the second side surface.

18. A chain guard for protecting a lumber drag chain comprising:
an elongated molded plastic body having a length 4-12 inches, a width of 1-6 inches, a thickness of ¼ to 2 inches, the body having at least one overhanging edge along a portion of one side of the length of the body, the overhanging edge having a thickness of 1/16 to ¼ inches, the edge and body being constructed so that when the chain guard is mounted on a chain link, adjacent links can pivot about connecting pins, a single weld hole in the body constructed to receive a weld washer, the body constructed to contact at least a portion of an outer surface of a chain link and contacting at least a portion of top side surface or bottom side surface of a chain link, the body being sized to extend beyond a bottom of the chain link surface so that during use lumber contacts the chain guard and not the chain link, the weld hole being located on the body so that during use unwanted rotation of the chain guard around the weld washer is prevented by the overhanging edge contacting the top side surface or bottom side surface of the chain link.

* * * * *